Nov. 18, 1941.   W. BOLSTER   2,263,232

MULTIPLE GYRO AIR BORNE COMPASS

Filed June 22, 1940

INVENTOR
WILLIAM BOLSTER,
BY Herbert H. Thompson
his ATTORNEY.

Patented Nov. 18, 1941

2,263,232

UNITED STATES PATENT OFFICE 2,263,232

MULTIPLE GYRO AIR BORNE COMPASS

William Bolster, Locust Valley, N. Y., assignor to Sperry Gyroscope Company, Inc., Brooklyn, N. Y., a corporation of New York Application June 22, 1940, Serial No. 341,850

8 Claims. (Cl. 33—226)

This invention relates to air borne and preferably air spun gyroscopic compasses. According to my invention, the sensitive element is universally supported in a single spherical air bearing (which may be in two parts), for rotation about a vertical axis and tilting about both principal horizontal axes. Said element supports at least two gyroscopic rotor elements which are preferably mounted for spinning about horizontal axes inclined to one another and normally inclined to the north-south line to obtain equal periods of oscillation about both horizontal axes. Each gyro rotor is mounted in a rotor bearing frame which is supported in the sensitive element by spherical air bearings so shaped as to provide freedom about spaced vertical axes within the element. The two rotor bearing frames are coupled so that the gyros cannot turn or precess independently about their vertical axes except in opposite directions, so that in attempting to turn about the vertical axis in the same direction, the gyroscopes carry with them the main sensitive element. For spinning the rotors, air is led in through the gimbal axis and through the several spherical air bearings to supply air to the spinning jet or jets within the gyro casing. The air is finally discharged downwardly so as not to disturb the compass.

Referring to the drawing.

Figure 1:
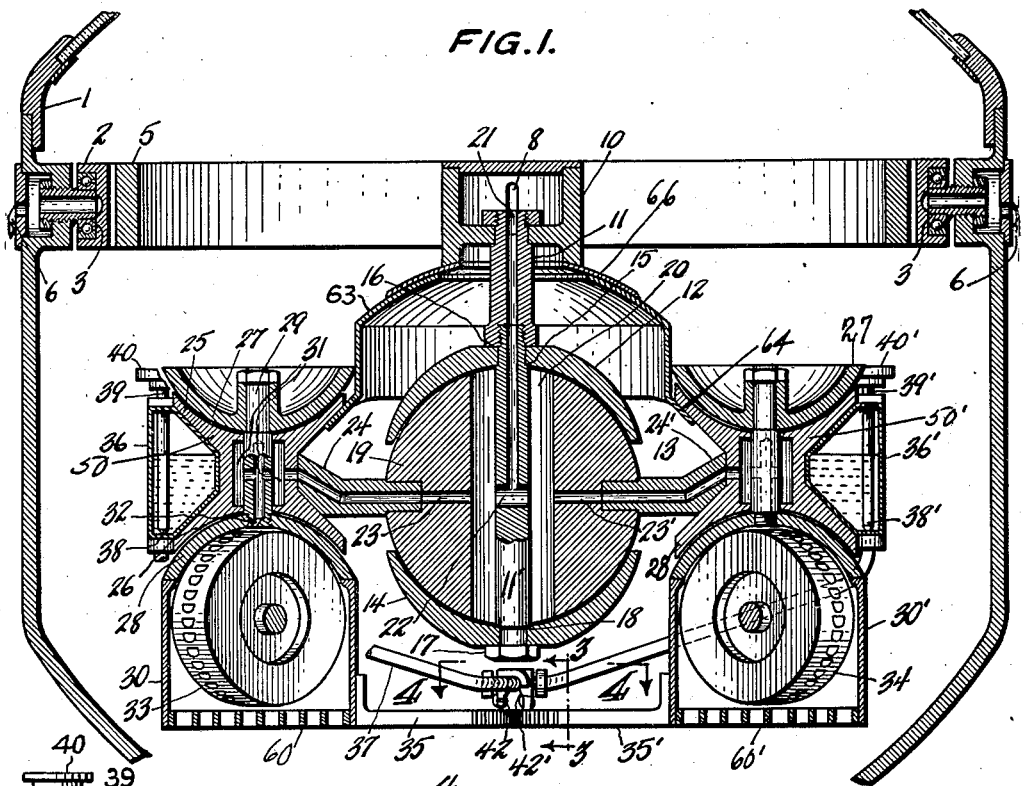
Fig. 1 is a vertical section through a gyroscopic compass constructed in accordance with my invention, taken on broken line 1—1 of Fig. 2.

It is to be understood that the drawing is largely diagrammatic, no attempt being made to show any follow-up or repeater systems as usually employed on gyro compasses, or the usual correction devices for the north-south steaming error.

The gyro campass is shown as universally supported within the outer casing or binnacle housing 1 by means of a gimbal ring 2 pivoted on major trunnions 3, 3 within the binnacle. Within said gimbal ring is pivoted on minor trunnions 4, 4, a ring or spider 5 from which the compass is suspended. The trunnions 3 and 4 are shown as made hollow so that compressed air may be introduced, as from a pipe or pipes 6, to pass within a circular channel 7 in the gimbal ring 2 and thence through the hollow trunnions 4 to channels 8 in the spider legs or spokes 9, from which the air is introduced into a central supporting hub 10 which is carried by the spokes 9 of the spider.

From the hub is suspended a hollow shaft 11 which is shown as made in two parts and as supporting at least the upper half or cup 12 of the single main spherical bearing for the sensitive element 13 by which the compass is universally supported. The lower half or cup 14 may also be supported from the stem 11. The upper cup is shown as having a central aperture through which the stem passes, the cup being clamped between shoulders 15 on the lower part 11' of the stem and the bottom 16 of the upper part of the stem, the two parts being threaded together as shown. The lower cup is similarly constructed and clamped in place by a nut 17 drawing the cup against shoulder 18 on the stem 11'. The supporting portion of the sensitive element is made in the form of a sphere 19 having an axial bore 20 somewhat larger than the diameter of the stem 11', so that all normal tilts of the sensitive element in any plane may take place without striking the supporting stem.

Air under pressure is supplied to the cooperating spherical bearing surfaces of the sphere and cups through the central aperture 21 in the stem, which receives air at the top from the hub 10 and which discharges air through cross aperture 22 into the axial bore 20. A portion of the air in the bore escapes at the top and bottom between each cup and th. sphere, thus furnishing a universal air bearing support. Other portions of the air pass horizontally out through apertures 23 and 23' in the sphere for spinning the rotors and supplying lubricating air to the air bearings hereinafter described.

On each side of the sphere, in line with said apertures 23, are secured laterally projecting arms 24, 24' which support spools 50, 50', which provide half of the air bearings providing freedom of the gyroscopes about spaced vertical axes. Each spool is cupped at its ends to form upwardly and downwardly facing cups 25, 26. Cooperating spherical buttons 27 and 28 are secured to a hollow vertical stem 29 passing through each spool and form the support for the rotor bearing casings 30 and 30', the lower button being shown as forming the top of such casing. Air is shown as passing from the radial bores 23 and 23' through bores in the brackets 24 and 24' and thence into the vertical bore 31 within the brackets 24 and 24'. Thence portions of the air flows through apertures within the vertical stems 29 and thence passes downwardly to the spinning jets 32. Other portions of the air passes upwardly and downwardly around the stem and thence between the spherical bearing surfaces of the cups and buttons, thus providing freedom about spaced vertical axes. It will be evident, however, that the gyro casings cannot tilt about either horizontal axis within the sensitive element since the centers of curvature of the spherical bearings are spaced and not coincident.

The respective rotors 33 and 34 are journaled in any suitable form of bearings within their respective casings 30 and 30' on normally horizontal axes. Said axes, however, are maintained normally at a predetermined angle to one another as by means of gear segments 35, 35', or other linkage, which permit only equal and opposite turning of the frames or casings.

For damping the compass, I may provide a plurality of liquid containers 36 and 36' situated on opposite sides of the compass and shown as secured to the spools 50 and 50'. Said containers are connected by a restricted pipe 37 so that as oil flows from one container to the other, energy is absorbed and the flow kept out of phase with the tilt. The entrance to each pipe is shown as in the form of a needle valve 38, 38' which may be adjusted at will by means of a threaded stem 39, 39' and knob 40, 40' respectively, to vary the rate of flow and hence the damping factor.

Figures 2, 3, 4, 5:
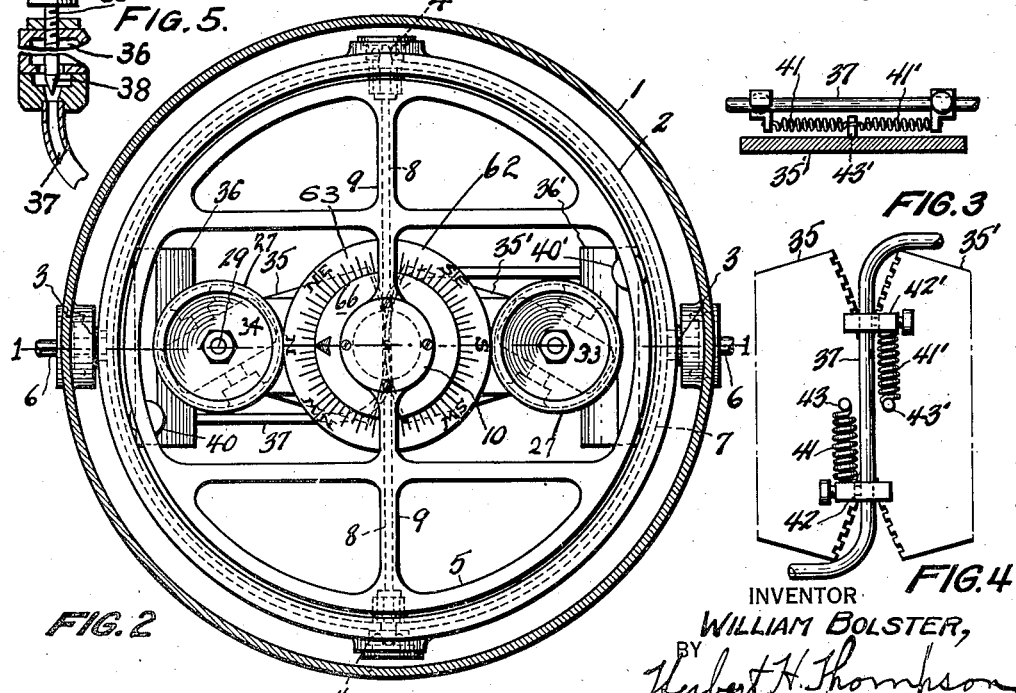
Fig. 2 is a plan view of the same, the outer casing being in section.
Fig. 3 is a detailed section taken on line 3—3 of Fig. 1, looking in the direction of the arrows.
Fig. 4 is a detailed plan view showing the spring and gear couplings between the gyro casings.
Fig. 5 is a detail, in section, of the throttle valve used in the damping system.

In addition to the connecting gears 35 and 35', I may also provide springs 41 and 41' which yieldingly connect the gyro casings to the sensitive element framework. Said springs are shown as extending horizontally above the gears 35, 35' (see Fig. 4). Each is secured at its outer end to a clamp 42, 42' secured to the cross pipe 37 and at its inner end to a pin 43, 43' on one or the other of the gear segments 35, 35'. The springs therefore act to take up any lost motion between the gears, act as a yielding connection between the gyro casings and the sensitive element, and act to prevent the gyros from wandering away from their normal position.

The compass card 62 is shown as marked on the dome-shaped sheet metal structure 63 which is connected at its outer lower periphery by flanges 64 to the spools 50, 50'. The member 63 is shown as passing under, without touching, a sheet metal shield 66 secured to the bottom of the hub 10 so that the main spherical bearings are protected by a roof.

It will be understood that the sensitive element of the gyro compass, i. e., the sphere and all parts supported thereby, is preferably made pendulous in order to give the proper gravitational control to impart meridian seeking properties. I also preferably maintain the gyro spin axes at predetermined equal and opposite angles to the meridian. By properly selecting the aforesaid angles and stiffness of springs 41 and 41', the period of the sensitive element as a pendulum about the N-S horizontal axis is preferably made substantially as long as it is about its E-W horizontal axis, i. e., about 85 minutes. By this means the quadrantal error due to rolling and pitching is avoided and a base line is provided by which the supporting gimbals may be stabilized about one or both axes, if desired.

It will be understood that while the operating air is spoken of in this specification and claims as "compressed air," air below atmospheric pressure may be used if desired, (as is common in the art of aircraft instruments), by the simple expedient of evacuating the outer gimbal housing 1 and allowing air at atmospheric pressure to flow in through the passages 6 and through the hollow gimbals, as aforesaid.

After the air is used to spin the rotors, it discharges into the casing 1 in a direction and at such a low velocity as not to disturb the gyro compass. As shown, the used air is discharged downwardly from each rotor bearing casing 30, 30' through a grillwork 60, 60' so that eddy currents are avoided and no torque exerted about the vertical axis and no unbalanced torque about any horizontal axis.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In an air borne gyro compass, a central sphere having air passages therethrough, a complementary cup member thereunder, means including one of said passages for supplying an air film between said sphere and cup for universally supporting the sphere for turning about a vertical axis and oscillation about both horizontal axes, a plurality of rotors and rotor bearing frames, supporting means for said frames secured to said sphere and having passages in communication with said passages in said sphere, spherical air bearings also in communication with said passage for supporting said frames for turning about separate vertical axes within said supporting means, and a common means for supplying air films for said spherical air bearings through said passages.

2. A gyro compass as claimed in claim 1, in which said rotors are air spun and a common air supply is provided for all air bearings and for spinning the rotors.

3. A gyro compass as claimed in claim 1, having connecting means between said rotor bearing frames permitting only equal and opposite turning of said frames about their respective vertical axes and normally holding their axes at equal and opposite acute angles to the meridian.

4. In an air borne gyro compass, a central sphere having a normally vertical axial aperture, a complementary cup member thereunder for universally supporting the sphere for turning about a vertical axis and oscillation about both horizontal axes, a hollow stem for supporting said cup member passing upwardly through the bore of said sphere and of substantially less diameter than said bore, vertical bearing members supported by and laterally extending from said sphere, rotor bearing frames, air bearings supporting said frames in said members for freedom about vertical axes, air spun rotors journaled in said frames, and means for supplying compressed air through said hollow stem to pass within the aperture in said sphere, whence a portion of said air escapes as an air film between said cup and sphere and other portions pass laterally within said members for supplying air films for said air bearings.

5. An air borne compass as claimed in claim 4, also having a complementary upper cup member supported by said stem and the air film for which is supplied from said axial aperture within said sphere.

6. In an air borne gyro compass, a central sphere having a normally vertical axial aperture, a complementary two-part cup member above and below said sphere, substantially closing said aperture and universally supporting the sphere for turning about a vertical axis and oscillation about both horizontal axes, a hollow stem for supporting both cup members passing through said aperture and cup member and as of substantially less diameter than said aperture, a plurality of rotors and rotor bearing frames, supporting means therefor secured to said sphere on opposite sides thereof, spherical air bearings for supporting said frames for turning about separate vertical axes within said supporting means, and means for supplying compressed air to pass through said stem into said axial aperture, whence a portion thereof escapes as air films between said cup and sphere, and other portions pass laterally within said frames to provide air films for said spherical air bearings.

7. An air borne compass as claimed in claim 6, in which still another portion of the air is used to spin the rotors.

8. In a multi-gyro compass, a pair of laterally spaced rotors and rotor bearing frames, a vertical stem on each frame, oppositely facing spherical buttons secured to each stem, complementary oppositely facing cups for said buttons providing vertical spherical air bearings supporting said frames for freedom about spaced vertical axes in said cups, a centrally located sphere, means supporting said cups on each side of said sphere, cups above and below said sphere to support the same, and means for causing air flow between each of said cups and the supported spherical bearing.

WILLIAM BOLSTER.